United States Patent
Prasad et al.

(10) Patent No.: US 9,813,922 B2
(45) Date of Patent: Nov. 7, 2017

(54) SYSTEM AND METHOD FOR RESOURCE MANAGEMENT IN HETEROGENEOUS WIRELESS NETWORKS

(71) Applicant: NEC Laboratories America, Inc., Princeton, NJ (US)

(72) Inventors: Narayan Prasad, Willow Grove, PA (US); Vaibhav Singh, Austin, TX (US); Sampath Rangarajan, Bridgewater, NJ (US)

(73) Assignee: NEC Corporation, Tokyo (JP)

( * ) Notice: Subject to any disclaimer, the term of this patent is extended or adjusted under 35 U.S.C. 154(b) by 137 days.

(21) Appl. No.: 14/812,580

(22) Filed: Jul. 29, 2015

(65) Prior Publication Data
US 2016/0037387 A1     Feb. 4, 2016

Related U.S. Application Data

(60) Provisional application No. 62/030,368, filed on Jul. 29, 2014, provisional application No. 62/101,183, filed on Jan. 8, 2015.

(51) Int. Cl.
*H04W 24/02* (2009.01)
*H04W 28/02* (2009.01)
(Continued)

(52) U.S. Cl.
CPC .......... *H04W 24/02* (2013.01); *H04L 47/41* (2013.01); *H04W 28/02* (2013.01); *H04W 72/0446* (2013.01)

(58) Field of Classification Search
CPC ..... H04W 24/02; H04W 72/04; H04W 28/02; H04W 72/0446; H04W 72/048; H04L 47/41
See application file for complete search history.

(56) References Cited

U.S. PATENT DOCUMENTS

| | | | |
|---|---|---|---|
| 2008/0137608 A1* | 6/2008 | Bu | H04W 28/18 370/331 |
| 2013/0310058 A1* | 11/2013 | Ibrahim | H04W 72/082 455/452.1 |

(Continued)

OTHER PUBLICATIONS

Borst et al., "Throughput Utility Optimization in HetNets," IEEE 77th, Vehicular Technology Conference (VTC Spring), Jun. 2013, pp. 1-5.

(Continued)

*Primary Examiner* — Paul H Masur
*Assistant Examiner* — Michael Phillips
(74) *Attorney, Agent, or Firm* — Joseph Kolodka

(57) ABSTRACT

A system and method for resource management in a heterogeneous wireless network wherein the resources of the mobile communications system are managed on a coarse time-scale and a fine time-scale. The coarse time-scale management comprises a first stage of determining the user association for each of the plurality of TPs followed by a second stage of determining activation fractions for all TPs. The determining of the user association is performed by utilizing a GLS procedure having a Greedy Stage and a Local Search Stage. In the Greedy Stage, new user, TP pairs are analyzed and the pair with the greatest improvement in system utility is selected. In the Local Search Stage, potential swaps are analyzed and a pair offering the greatest improvement that exceeds a threshold is selected. The determining of activation fractions for all TPs is performed by utilizing an auxiliary function method.

18 Claims, 5 Drawing Sheets

(51) Int. Cl.
*H04L 12/891* (2013.01)
*H04W 72/04* (2009.01)

(56) References Cited

U.S. PATENT DOCUMENTS

| | | | | |
|---|---|---|---|---|
| 2013/0315092 | A1* | 11/2013 | Yu | H04W 52/0216 |
| | | | | 370/252 |
| 2014/0161058 | A1* | 6/2014 | Sundaresan | H04L 5/0058 |
| | | | | 370/329 |
| 2015/0295685 | A1* | 10/2015 | Borst | H04L 5/0035 |
| | | | | 370/329 |
| 2015/0312901 | A1* | 10/2015 | Yoshizawa | H04W 72/042 |
| | | | | 370/329 |
| 2015/0350919 | A1* | 12/2015 | Patel | H04W 16/18 |
| | | | | 370/252 |
| 2016/0028448 | A1* | 1/2016 | Park | H04B 7/26 |
| | | | | 375/267 |

OTHER PUBLICATIONS

Bedekar et al., "Optimal Muting and Load Balancing for eICIC," 2013 11th International Symposium and Workshops on Modeling and Optimization in Mobile, Ad Hoc and Wireless Networks (WiOpt), May 13-17, 2013 pp. 280-287.

\* cited by examiner

SYSTEM AND METHOD FOR RESOURCE MANAGEMENT IN HETEROGENEOUS WIRELESS NETWORKS

RELATED APPLICATION INFORMATION

This application claims priority to provisional application Ser. No. 62/030,368, filed on Jul. 29, 2014 and provisional application Ser. No. 62/101,183, filed on Jan. 8, 2015, incorporated herein by reference.

BACKGROUND

Technical Field

The present invention relates to mobile communications systems, and more particularly, heterogeneous wireless networks.

Description of the Related Art

Heterogeneous wireless networks (HetNets) are a type of mobile communications system comprising a multitude of disparate transmission points (TPs) deployed in an irregular fashion. HetNets are expected to be increasingly common wireless network systems in the future. Resource management for HetNets is typically performed within a coordination area comprising a set of TPs and a set of users that the TPs should serve. In HetNet systems having a backhaul with a relatively high latency (up to several dozens of milliseconds), coordinated resource management decisions are not able to be achieved within fine slot-level granularity which is typically a millisecond because the coordinated management requires exchanges of messages and signaling over the backhaul.

Semi-static resource management schemes wherein the resource management is performed over a set of TPs at two time scales have been developed for systems having a backhaul with a high latency and have been found to provide a more robust management. In these semi-static schemes, coordinated resource management may be performed at a coarse frame-level time-scale which is a time length at least as large as the backhaul latency. The coarse frame-level time-scale coordinated management may be based on averaged (not instantaneous) slowly varying metrics that are relevant for a period longer than the backhaul latency. Resource management may also be performed on a fine time-scale. The fine time-scale resource management may be performed independently by a TP without coordination amongst the other TPs.

Resource management for a cluster of TPs that includes multiple high power macro TPs as well as several low power pico TPs is very complicated due to the backhaul latency, irregular topology and the fact that there may not be one common dominant interferer for all TPs.

Some known resource management schemes have exploited cell dormancy in which each TP is made active or inactive for an entire frame duration. Other known resource management schemes have combined partial muting in which a single TP is made active or inactive for a time interval that is a fraction of the frame duration. The fraction of the frame duration for which a TP is active is known as the "activation fraction" of the TP. Load balancing which is also referred to as "user association" has also been implemented wherein each user is associated with a specific TP during a frame duration. However, current resource management systems and methods do not scale in an effective manner when activation fractions of all TPs have to be optimized.

SUMMARY

A method implemented in a mobile communications system having a plurality of transmission points (TPs) and at least one user, comprising the step of managing the resources of the mobile communications system on two time scales including a coarse time-scale management and a fine time-scale management. The coarse time-scale management comprises a first stage of determining the user association for each of the plurality of TPs followed by a second stage of determining activation fractions for all TPs. The first and second stages are performed at the start of each frame. The determining of the user association is performed by utilizing a GLS procedure having a Greedy Stage and a Local Search Stage. The Greedy Stage comprises a first step of inputting average single-user rates and a fairness factor. A set containing all selected user, TP pairs is defined as a null set. System utility gains from different user, TP pairs are analyzed and a user, TP pair is selected based on the user having not been previously selected and the pair provides a most favorable incremental change for system utility among all user, TP pairs. A determination is made whether all users have been assigned a TP. If some users have not been assigned a TP, the Greedy Stage is performed again beginning from the step of selecting a user, TP pair. If all users have been selected, the set of selected user, TP pairs is output.

A base station used in a mobile communications system having a plurality of transmission points (TPs) and at least one user. The base station includes a Resource Management (RM) module configured to manage the resources of the mobile communications system on two time scales including a coarse time-scale management and a fine time-scale management. The coarse time-scale management that the RM module is configured to perform comprises a determination of user association for each of the plurality of TPs followed by a determination of activation fractions for all TPs. The RM module is configured to produce the determinations at the start of each frame. The RM module is configured to determine the user association by utilizing a GLS procedure having a Greedy Stage and a Local Search Stage. For the Greedy Stage, the RM module is configured to input average single-user rates and a fairness factor. The RM module is further configured to define a set containing all selected user, TP pairs as a null set. The RM module is further configured to analyze system utility gains from different user, TP pairs and select a user, TP pair based on the user having not been previously selected and the pair provides a most favorable incremental change for system utility among all user, TP pairs. The RM module is configured to determine if all users have been assigned a TP wherein if some users have not been assigned a TP, the RM module is configured to perform the Greedy Stage again beginning from the step of selecting a user, TP pair. If all users have been selected, the RM module is configured to output the set of selected user, TP pairs.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
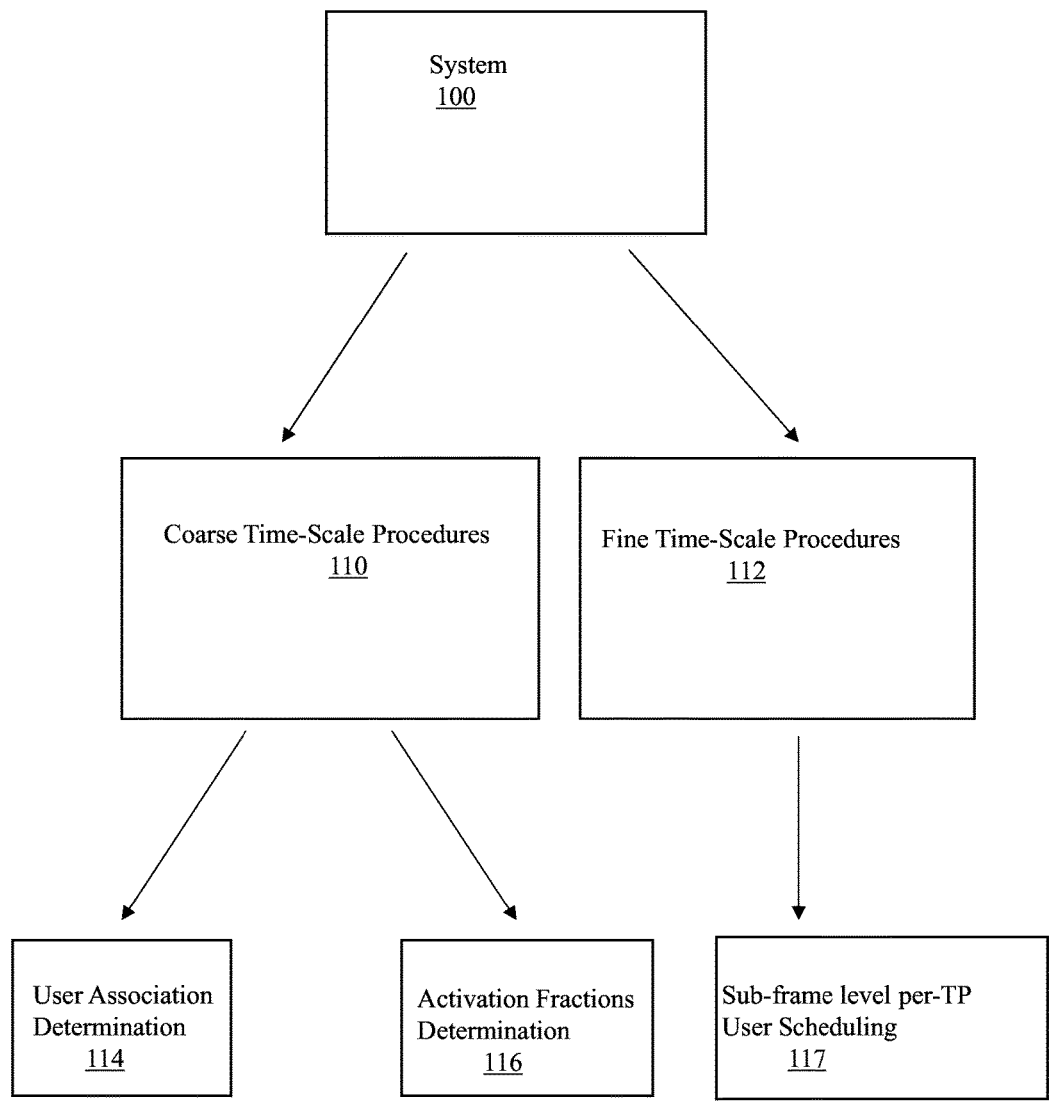
FIG. 1 is a block/flow diagram illustratively depicting a resource management framework for mobile communications systems in accordance with the present principles.

In accordance with the present principles, systems and methods are provided for managing the resources of a mobile communications system. The systems and methods are configured to manage the resources of the mobile communications system on a coarse time-scale and a fine time-scale. The coarse time-scale management includes a determination of user association for each of the plurality of TPs followed by a determination of activation fractions for all TPs. A GLS procedure is performed which features a Greedy Stage and a Local Search Stage in order to determine the user association. The system utility considered by the GLS procedure subsumes a max-min fairness, proportional fairness, average delay or sum throughput within a practical system. The resource management system and method feature an alternating optimization framework which results in improvements in the system utility, including significant improvements in both the average and the 5-percentile spectral efficiencies.

Embodiments described herein may be entirely hardware, entirely software or may include both hardware and software elements which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

Referring now to FIG. 1, a block/flow diagram illustratively depicting an improved resource management framework for a mobile communications system 100, such as a HetNet, in accordance with one embodiment of the present principles. The mobile communications system 100 includes a series of TPs 103 and one or more users 105 of the system. The system 100 is configured to perform coarse time-scale procedures 110 wherein at the start of each frame a determination 114 concerning which users to associate with each TP and a determination 116 of the activation fraction for each TP is performed. The system 100 is configured to coordinate the coarse time-scale procedures over all of the TPs. The coarse time-scale procedures utilize data that is averaged (not instantaneous) and which are slowly varying metrics that are relevant for a period longer than the backhaul latency.

The system 100 is also configured to perform fine time-scale procedures 112, wherein each active TP independently performs sub-frame level scheduling 117 while confirming to its assigned activation fraction, over the set of users associated with it, without any coordination with any of the other active TPs. The fine time-scale procedures 112 are preferably performed based on quickly changing data, such as instantaneous rate or the signal-to-interference-plus-noise ratio (SINR) estimates that are received directly by the TP from the users associated to it.

Figure 2:
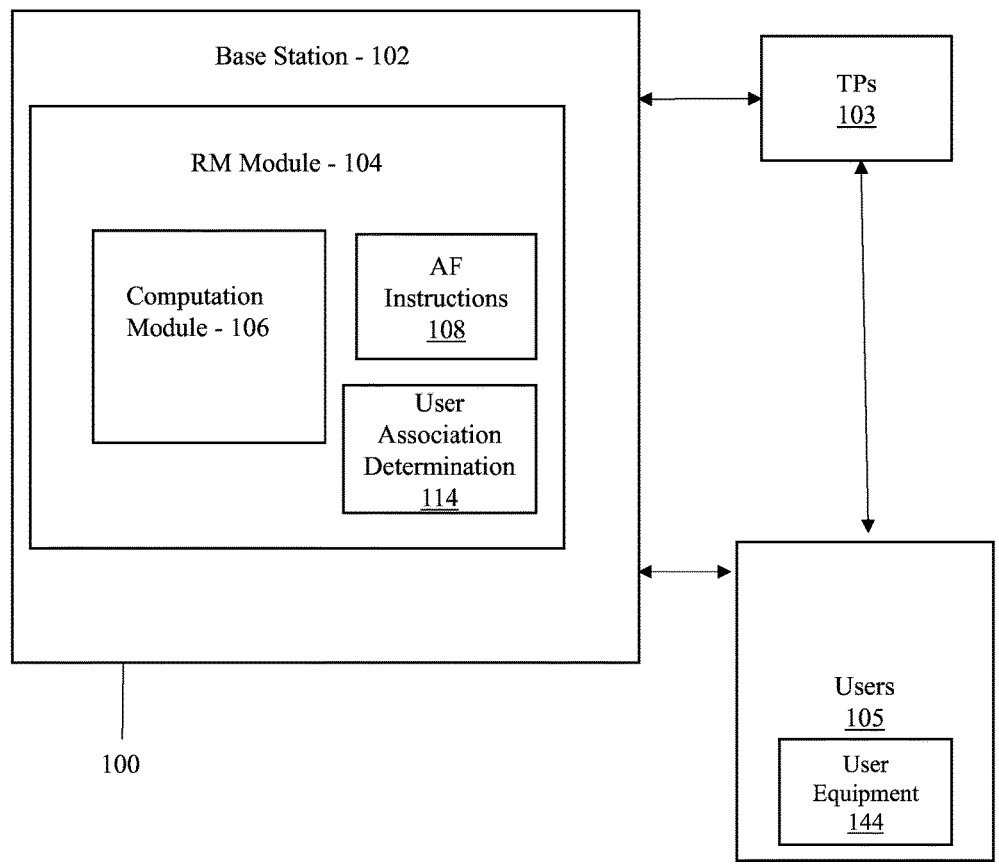
FIG. 2 is a block/flow diagram illustratively depicting a base station for a mobile communications system in accordance with the present principles.

Referring now to FIG. 2, a block/flow diagram illustratively depicting a base station 102 for a mobile communications system 100, such as a HetNet, is shown in accordance with one embodiment of the present principles. The base station 102 includes a resource management (RM) module 104 which is configured to jointly determine the coarse time scale procedures 110 for the user association determination 114 and activation fraction determination 116 for the system 100 utilizing an alternating joint optimization procedure. The RM module may be comprised entirely of hardware or may include both hardware and software elements.

Figure 3:
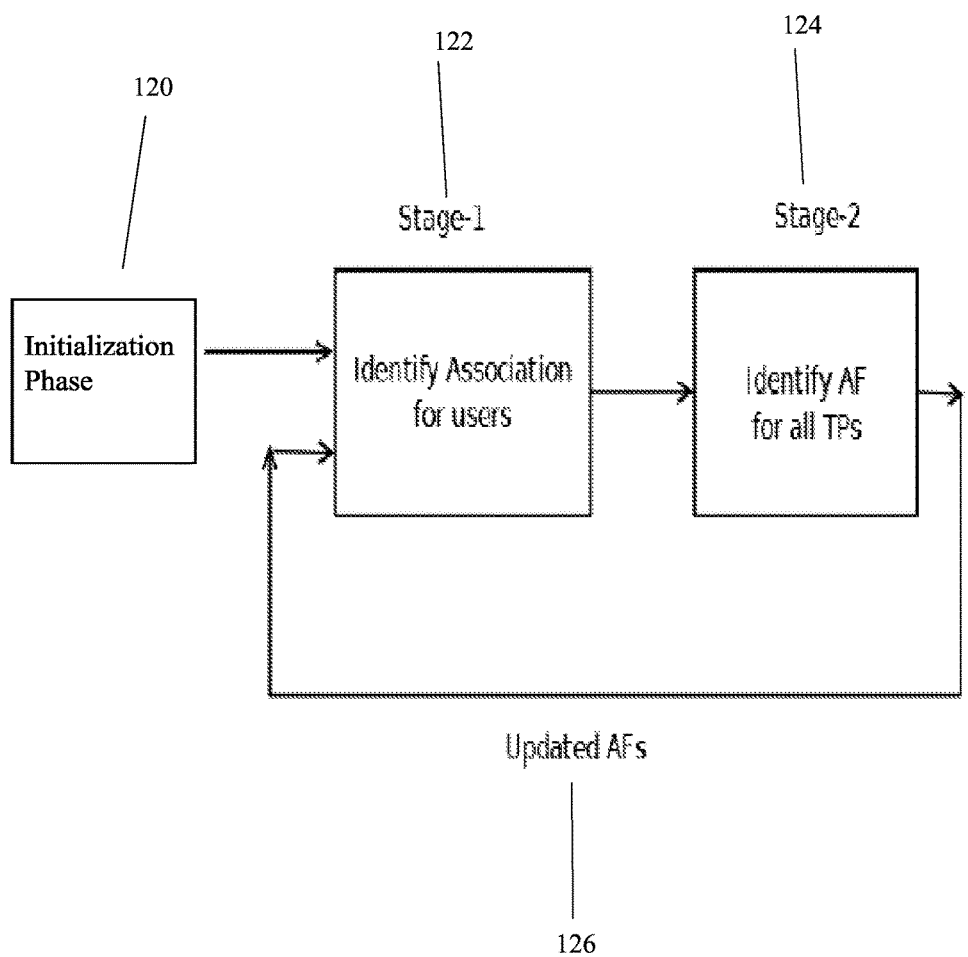
FIG. 3 is a block/flow diagram illustratively depicting a framework for the joint optimization procedure in accordance with the present principles.

Referring now to FIG. 3, a block/flow diagram illustratively depicting the framework for the joint optimization procedure performed by the RM module 104 is shown in accordance with one embodiment of the present principles. The RM module 104 is configured to perform an initialization phase 120 wherein the optimization procedure commences with the activation fraction equal to 1 for all TPs. In Stage One 122 of the optimization procedure, the RM module 104 is configured to make a determination 114 concerning which user is associated with each TP. In Stage Two 124 of the procedure, the RM module 104 is configured to make a determination 116 concerning the activation fraction for all TPs. The RM module 104 is configured to update 126 the activation fractions for all TPs after the determinations 114, 116 in Stages One and Two 122, 124 have been made. The determination 116 of the activation fraction for each TP and the determination 114 of the user association for all TPs is preferably made once for each frame in order to optimize the system utility.

As shown in FIG. 2, the RM module 104 includes a computation module 106 which is configured to compute a tractable expression for the single-user rate that can be achieved for any user upon being associated to any TP. The single-user rate takes into consideration the activation fractions of all of the TPs when computing the single-user rate. Furthermore, in a preferred embodiment, users may be prioritized based on their weights. The RM module 104 is configured to receive the computed single-user rate and utilize this rate for the joint optimization procedure. A tunable fairness factor α may be incorporated in the system utility considered by the joint optimization procedure.

In a preferred embodiment, the RM module 104 is configured to produce the user association determination 114 in Stage One 122 of the joint optimization procedure by using a GLS procedure. The GLS procedure comprises a first stage 118 which is considered the "Greedy Stage". The GLS procedure also comprises a second stage 132 which is considered the "Local Search Stage".

Figure 4:
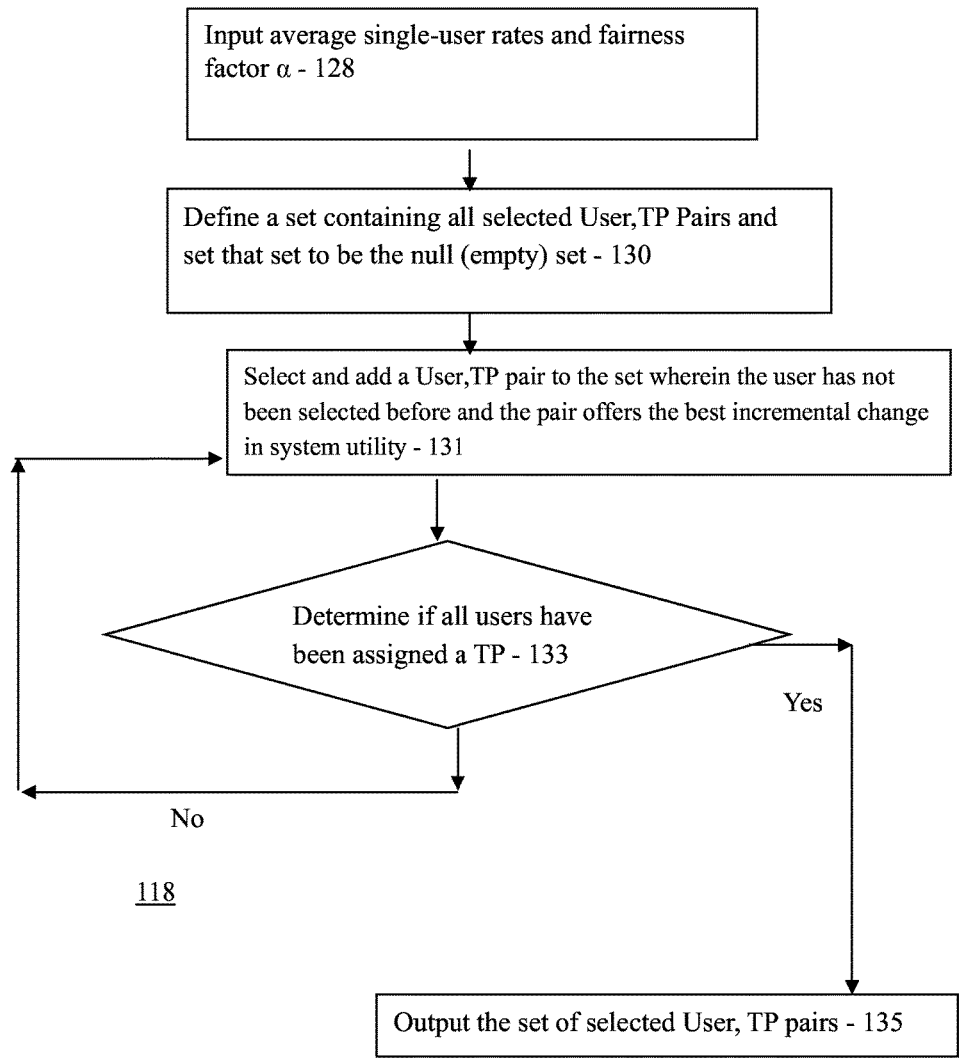
FIG. 4 is a block/flow diagram illustratively depicting the Greedy Stage of the joint optimization procedure in accordance with the present principles.

Referring now to FIG. 4, a block/flow diagram illustratively depicting the Greedy Stage procedure 118 performed by the RM module 104 is shown in accordance with one embodiment of the present principles. In the Greedy Stage, data pairs representing a specific user to a specifically assigned TP are analyzed by the RM module 104 and the pair that offers the most favorable incremental change to the system utility is chosen. The new user, TP pairs are preferably analyzed while considering the feasibility with respect to the pairs that have already been selected. The pair with the best change in system utility is selected until no new pair can be found.

More specifically, as shown in FIG. 4, the first step 122 of the Greedy Stage 118 procedure comprises inputting the average single-user rates determined by the computation module 106 into a portion of the RM module 104 configured to perform the user association determination. In the second step 130, the RM module 104 is configured to define a set containing all selected user, TP pairs. The RM module 104 is configured to define this set as the null (empty) set. In the third step 131, a user, TP pair is selected and added to the set based on the criteria that the user has not been selected before and that the pair that is selected offers the greatest incremental improvement in the system utility among all pairs containing such users.

In one embodiment, the following formula is implemented in order to determine the data pair providing the best utility gain to the system 100:

$$\operatorname{argmax}(k,b)\in\Omega:\tilde{} G\cup(k,b)\in I\{g(\tilde{} G\cup(k,b),\alpha)-g(\tilde{} G,\alpha)\},$$
$$\alpha\in(0,1],$$

$$\operatorname{argmin}(k,b)\in\Omega:\tilde{} G\cup(k,b)\in I\{g(\tilde{} G\cup(k,b),\alpha)-g(\tilde{} G,\alpha)\},$$
$$\alpha>1$$

In the fourth step 133, the RM module 106 is configured to determine if all users have been assigned a TP. If there are users that have not been assigned a TP, the RM module 104 is configured to perform the third step 131 of the Greedy Stage again wherein a user, TP pair is selected and added to the set if the user has not been selected before and the pair offers the best incremental change in system utility. If all users have been selected, the RM module 104 is configured to output 135 the determined set of selected User, TP pairs.

Figure 5:
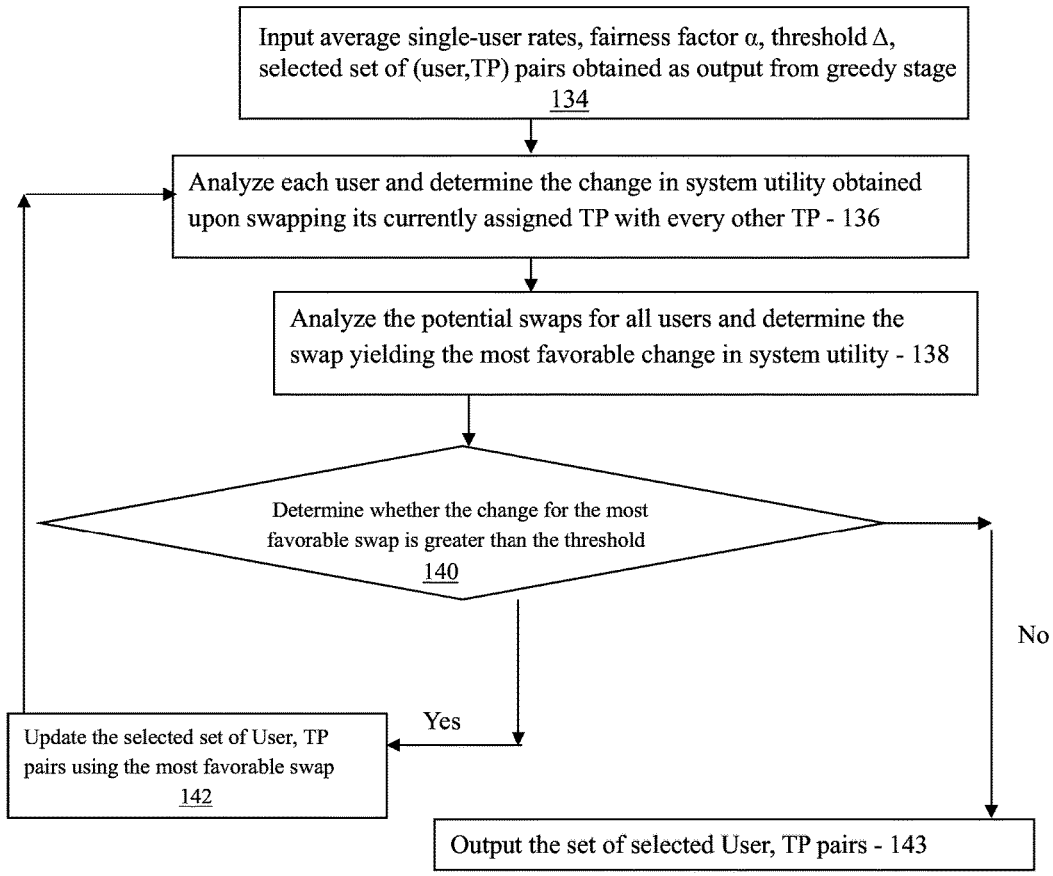
FIG. 5 is a block/flow diagram illustratively depicting the Local Search Stage of the joint optimization procedure in accordance with the present principles.

Referring now to FIG. 5, a block/flow diagram illustratively depicting the Local Search Stage 132 of the GLS procedure is shown in accordance with one embodiment of the present principles. In the first step 134 of the Local Search procedure, the average single-user rates computed for the current set of activation fractions is input into the RM module 104 along with a fairness factor α, a predetermined improvement threshold Δ and the selected set of user, TP pairs output in the Greedy Stage 118.

In the second step 136 of the Local Search Stage, the RM module 104 is configured to analyze each user and determine the change in system utility obtained by swapping the currently assigned TP for that user with every other TP. In the third step 138, the RM module 104 is configured to analyze the potential swap for all users and determine the most favorable swap which provides the greatest improvement in the system utility.

In the fourth step 140, the RM module is configured to compare the improvement for the swap determined to be the most favorable swap with the threshold Δ and determine if the improvement is greater than the threshold. If the improvement is greater than the threshold, then the RM Module 104 is configured to perform a fifth step 142 wherein the selected set of user, TP pairs is updated to include the most favorable swap. The RM module 104 is configured to then proceed to the second step 132 of the Local Search procedure wherein the RM module considers each user and determines the change in system utility obtained upon swapping the currently assigned TP for that user with every other TP.

If in the fourth step 140, the RM module determines that the improvement for the most favorable swap is less than the threshold, then the RM Module 104 is configured to output 143 the current set of selected user, TP pairs without any further swapping.

After the determination 114 is made by the RM module 104 concerning which user is associated with each TP, the RM Module is configured to perform Stage Two 124 of the optimization procedure wherein the fraction of a frame duration for which each TP 103 is made active is determined. In a preferred embodiment the RM module 104 is configured to exploit an auxiliary function method to compute the activation fractions. In a preferred embodiment, the RM module 104 is configured to generate instructions 108 representing the activation fraction determination 116. The instructions 108 may comprise a sub-frame level ON-OFF pattern for each TP in each frame. The RM module 104 is configured to transmit the instructions to each TP. In one embodiment, the RM module 104 may utilize an independent identically distributed (i.i.d.) Bernoulli random variable in order to determine the sub-frame level ON-OFF pattern for each TP in each frame. The ratio of the total number of ON subframes for each TP in the mobile communications system 100 and the total number of subframes in that frame is preferably equal to the target activation fraction for that TP.

The activation fractions optimization problem is a continuous optimization issue which involves the sum of complicated non-linear functions of the activation fractions (one such function for each TP). The activation fractions optimization problem appears to be intractable to efficiently and optimally solve. In accordance with the present principles, the auxiliary function method of the present application is configured to obtain a sufficient choice of activation fractions in an efficient manner. The auxiliary function method features the introduction of additional auxiliary variables. The activation fractions optimization problem is then re-formulated into a problem involving the joint optimization of a new objective function over the auxiliary variables and the activation fractions. The joint optimization problem is then addressed by optimizing sub-problems in an alternating manner until convergence. Notably, each sub-problem can either be solved using closed-form expressions or as geometric programs. This auxiliary function method provides guaranteed convergence and also lends itself to a distributed implementation.

The RM module 104 is configured to transmit the instructions 108 directly to the TP for which the activation fraction is determined and, if necessary, to other neighboring TPs as well. In one embodiment, the RM module 104 is configured to transmit the instructions 108 via a CoMP Hypothesis message or an enhanced Relative Narrowband Transmit Power (RNTP) message.

The RM module 104 is also configured to determine an activation fraction for a frame in the future for a particular TP, in order to account for backhaul delay. In one embodiment, the instructions for the ON-OFF pattern may include the starting time of the frame(s) for which the pattern is valid. The RM module 104 may also be configured to determine user association for one or more TPs for a frame in the future, in order to account for the backhaul delay.

While the embodiments have been described with respect to the optimization procedure being performed by a RM module 104 of a base station 102 of the system, in other embodiments, the optimization procedure may be performed by the user equipment 144 and/or the TPs 103 via a distributed implementation. The base station 102 or another component of the system may be configured to distribute the instructions for the joint optimization resource management procedure. For example, in one embodiment, Stage One 122 of the optimization procedure is performed by a distributed implementation of the GLS procedure comprising the following generalized instructions for the TP side and the user side:

```
Repeat [TP-side Procedure]
    Broadcast step: Transmit current load
    Monitoring step:
        If Request from any user detected
            If no user already admitted in current window
                Admit user and send ACK
                Update load using received effective weight
            Else
                Send NACK to user
            EndIf
        EndIf
    (Until no user request detected and no other TP changes its load)
Repeat [User-side Procedure]
    Listening step:
        Decode current load of each TP
        Determine TP yielding best change in system utility
        Send request to that TP along with effective weight
    (Until ACK received from requested TP)
```

In one example, the distributed Local Search Stage 132 may comprise the following generalized instructions for the TP side and the User side:

```
Repeat [TP-side Procedure]
    Broadcast step: Transmit current load information
    Monitoring step:
        If Request to associate from any user detected
            Determine decision to accept via randomized rule
            If decision to accept is positive
                Admit user and send ACK
                Update load information using received parameters
            Else
                Send NACK to user
            EndIf
        EndIF
        If request to release from any user detected
            Release user
```

```
            Update load information
        EndIf
    (Until convergence criterion satisfied)
Repeat [User-side Procedure]
    Listening step:
        Decode current load information of each TP
        Compute utility changes for all migrations
        Determine TP yielding best change in system utility
        Send request to associate to that TP if relative improvement is
        better that threshold
        If ACK received from requested TP
            Send request to release to current associated TP
            Send parameters to requested TP
        EndIf
    (Until convergence criterion satisfied)
```

The activation fractions determination 116 may also be performed by the user equipment 144 and/or the TPs 103 via a distributed implementation.

Referring to FIGS. 1 and 3-5, the present invention is also directed to methods for performing resource management for a mobile communications system as previously described. The method may be performed by any combination of hardware and/or software.

While the above configuration and steps are illustratively depicted according to one embodiment of the present principles, it is contemplated that other sorts of configurations and steps may also be employed according to the present principles. While various components have been illustratively described as separate components, the components may be formed in a variety of integrated hardware or software configurations.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. Additional information is provided in an appendix to the application entitled, "Additional Information". It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A method implemented in a mobile communications system having a plurality of transmission points (TPs) and at least one user, the method comprising:
    managing the resources of the mobile communications system on two time-scales including a coarse time-scale and a fine time-scale, wherein the coarse time-scale management comprises a first stage of determining a user association for each of the plurality of TPs followed by a second stage of determining activation fractions for all TPs, said first and second stages being performed at a start of a frame;
    utilizing a procedure having a greedy stage and a local search stage to determine the user association, wherein said greedy stage comprising the following steps:
    inputting average single-user rates and a fairness factor;

analyzing gains of system utility from different user, TP pairs, said gains of system utility being responsive to the average single-user rates and the fairness factor;

selecting a user, TP pair based on the user having not been previously selected and the TP pair providing a most favorable incremental change for system utility among all user, TP pairs;

determining if all users have been assigned a TP;

performing the greedy stage again beginning from the step of selecting the user, TP pair if some users have not been assigned the TP; and outputting a set of selected user, TP pairs if all users have been selected; and said local search stage comprises the following steps:

inputting the fairness factor, average single-user rates, an improvement threshold and the set of selected user, TP pairs output from the greedy stage;

analyzing each user and determining a change in system utility obtained by a potential swap of a currently assigned TP for each user with every other TP;

analyzing the potential swaps for all users and determining a most favorable swap which provides a greatest improvement in the system utility;

determining whether the improvement in the system utility for the most favorable swap is greater than the improvement threshold;

updating the selected set of user, TP pairs to include the most favorable swap if the improvement from the swap are greater than the improvement threshold and performing the local search stage again beginning with the step of analyzing each user and determining the change in system utility obtained by the potential swap; and outputting a current set of selected user, TP pairs if the improvement from the most favorable swap is less than the improvement threshold.

2. The method as recited in claim 1, wherein the fine time-scale management is performed based on quickly changing data comprising instantaneous rate or a signal to interference plus noise ratio.

3. The method as recited in claim 1, wherein the coarse time-scale management is performed based on slowly varying metrics that are relevant for a period longer than the backhaul latency.

4. The method as recited in claim 1, wherein the fine time-scale management is performed to modify the resource management of a specific TP without coordination with any of the other TPs.

5. The method as recited in claim 1, wherein the inputted average single user rates include a weight for prioritizing the at least one user.

6. The method as recited in claim 1, wherein the inputted average single user rate takes into consideration the activation fractions of all of the TPs.

7. The method as recited in claim 1, wherein the second stage of determining activation fractions for all TPs is performed by utilizing an auxiliary function method.

8. The method as recited in claim 1, wherein the determination of the activation fractions further includes generating a sub-frame level ON-OFF pattern for each TP in each frame and a ratio of a total number of ON subframes in the pattern generated for each TP and a total number of subframes in the frame is approximately equal to the determined activation fraction for that TP.

9. A base station used in a mobile communications system having a plurality of transmission points (TPs) and at least one user, the base station comprising:

a Resource Management (RM) module configured to manage the resources of the mobile communications system on two time scales including a coarse time-scale and a fine time-scale;

wherein the coarse time-scale management that the RM module is configured to perform comprises a determination of user association for each of the plurality of TPs followed by a determination of activation fractions for all TPs, said RM module being configured to produce the determinations at the start of each frame;

wherein the RM module is configured to determine the user association by utilizing a procedure having a greedy stage and a local search stage;

wherein in the greedy stage, the RM module is configured to input average single-user rates and a fairness factor;

the RM module is further configured to analyze system utility gains from different user, TP pairs and select a user, TP pair based on the user having not been previously selected and the TP pair provides a most favorable incremental change for system utility among all user, TP pairs; and the RM module is configured to determine if all users have been assigned a TP;

wherein the RM module is configured to perform the greedy stage again beginning from the step of selecting the user, TP pair if some users have not been assigned the TP;

wherein the RM module is configured to output the set of selected user, TP pairs if all users have been selected; and wherein in the local search stage, the RM module is configured to input the fairness factor, average single-user rates, an improvement threshold and the set of selected user, TP pairs output from the greedy stage;

the RM module is further configured to analyze each user and determine a change in system utility obtained by a potential swap of a currently assigned TP for each user with every other TP;

the RM module is configured to analyze the potential swaps for all users and determine a most favorable swap which provides a greatest improvement in the system utility; and the RM module is configured to determine whether the improvement in the system utility from the most favorable swap is greater than the improvement threshold;

wherein if the improvement from the swap is determined to be greater than the improvement threshold, the RM module is configured to update the selected set of user, TP pairs to include the most favorable swap and the RM module is configured to perform the local search stage again beginning with performing an analysis of each user and determining the change in system utility obtained by the potential swap;

wherein if the improvement from the most favorable swap is less than the improvement threshold, the RM module is configured to output the current set of selected user, TP pairs.

10. The base station as recited in claim 9, wherein the RM module is configured to perform the fine time-scale management based on quickly changing data comprising instantaneous rate or a signal to interference plus noise ratio.

11. The base station as recited in claim 9, wherein the RM module is configured to perform the coarse time-scale management based on slowly varying metrics that are relevant for a period longer than the backhaul latency.

12. The base station as recited in claim 9, wherein the RM module is configured to utilize the fine time-scale management to modify the resource management of a specific TP without coordination with any of the other TPs.

13. The base station as recited in claim 9, wherein a computation module is configured to compute the inputted average single user rates, said inputted average single user rates including a weight for prioritizing the at least one user.

14. The base station as recited in claim 13, wherein the computation module is configured to take into consideration the activation fractions of all of the TPs in order to compute the inputted average single user rates.

15. The base station as recited in claim 9, wherein the RM module is configured to utilize an auxiliary function method in order to determine the activation fractions for all TPs.

16. The base station as recited in claim 9, wherein the RM module is configured to generate a sub-frame level ON-OFF pattern for each TP in each frame after determining the activation fractions for all TPs, wherein the ratio of a total number of ON subframes in the pattern generated for the TP and a total number of subframes in the frame is approximately equal to the determined activation fraction for each TP.

17. The base station as recited in claim 16, wherein the RM module is configured to transmit the sub-frame level ON-OFF pattern via a CoMP Hypothesis message or an enhanced Relative Narrowband Transmit Power (RNTP) message.

18. The base station as recited in claim 9, wherein the RM module is configured to determine the activation fraction for a frame in the future for a particular TP.

\* \* \* \* \*